Oct. 7, 1952          R. W. HEWES          2,613,329
ALTIMETER SWITCH

Filed April 13, 1949                                            6 Sheets-Sheet 1

INVENTOR.
R. W. Hewes,
BY Neil W. Preston,
HIS ATTORNEY.

Oct. 7, 1952 R. W. HEWES 2,613,329
ALTIMETER SWITCH
Filed April 13, 1949 6 Sheets-Sheet 2

INVENTOR.
R. W. Hewes,
BY Neil W. Preston,
HIS ATTORNEY.

INVENTOR.
R. W. Hewes,
BY Neil W. Preston,
HIS ATTORNEY.

Oct. 7, 1952 — R. W. HEWES — 2,613,329
ALTIMETER SWITCH
Filed April 13, 1949 — 6 Sheets-Sheet 4
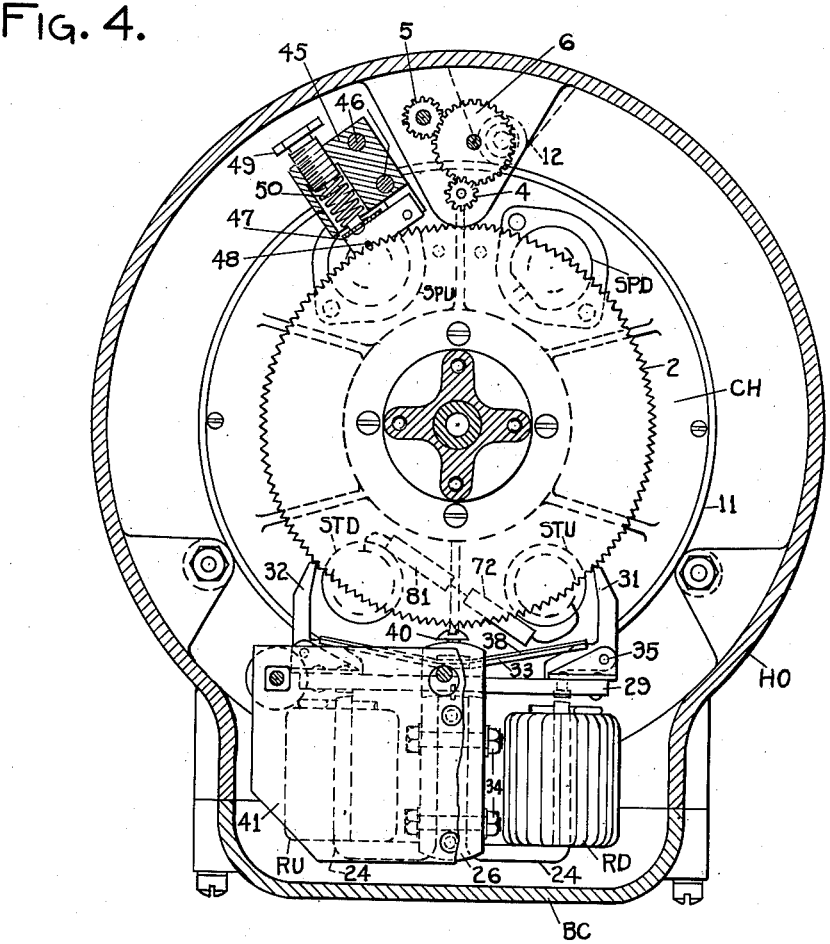
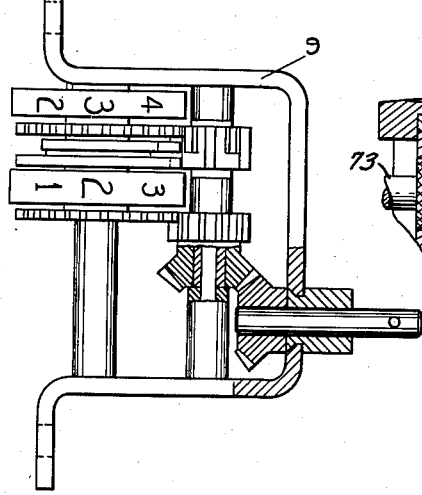
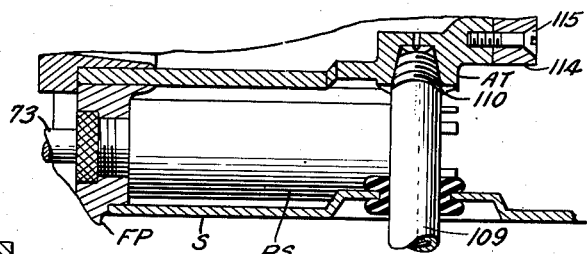
INVENTOR.
R. W. Hewes,
BY Neil W. Preston,
HIS ATTORNEY.

Oct. 7, 1952    R. W. HEWES    2,613,329
ALTIMETER SWITCH
Filed April 13, 1949    6 Sheets-Sheet 6

INVENTOR.
R. W. Hewes.
BY Neil W. Preston,
HIS ATTORNEY.

Patented Oct. 7, 1952

2,613,329

UNITED STATES PATENT OFFICE 2,613,329

ALTIMETER SWITCH

Ralph W. Hewes, Rochester, N. Y., assignor to General Railway Signal Company, Rochester, N. Y.

Application April 13, 1949, Serial No. 87,183

16 Claims. (Cl. 250—203)

This invention relates to an altimeter switch of the type used in air traffic control systems in which it is desired that the operation of an electrical circuit be automatically controlled by the operation of an aircraft altimeter in accordance with the altitude at which the aircraft is flying.

The altimeter switch of the present invention is to be considered in the nature of an improvement over the altitude control contact mechanism of the prior application by Field and Wight, Ser. No. 785,398, filed November 12, 1947; and it is to be understood that no claim is intended to be made herein to any subject matter disclosed in such prior application.

The altimeter in common use on modern aircraft is a sensitive instrument which consists, basically, of an aneroid barometer with the scale thereof calibrated to read altitude directly instead of barometric pressures. Only a small amount of torque is required to be produced by the mechanism in order to cause the shaft thereof, on which the indicating needle is mounted, to rotate. It is, consequently, not expedient to attach to the revolving shaft of an altimeter any device which would require that additional torque be expended by the shaft as this would seriously impair the accuracy of the instrument. For this reason, the mechanism of the present invention has been devised which provides for a switching operation governed by the rotation of the altimeter shaft but without requiring that additional torque be produced by the altimeter mechanism. It is contemplated that the altimeter switch of the present invention will be used in a circuit to control the transmission of signals indicative of the particular altitude at which the airplane is flying. These signals are received by a ground station which also receives signals from all other aircraft flying in a given region. The data received from these various aircraft is automatically evaluated by the ground station and signals are then transmitted back to each reporting aircraft giving an indication as to the traffic conditions in the particular altitude occupied by that airplane.

It is frequently necessary, however, in approaching an airway that the pilot first be informed as to the traffic condition at various altitudes so that he may safely choose an appropriate altitude at which to fly. For this reason, the altimeter switch of the present invention is provided with a means for "looking into" any altitude so that signals may be transmitted from the ground station indicative of conditions of that altitude. In this way the presence of the aircraft in a particular altitude may be simulated and the pilot informed as to whether the move to that altitude can safely be made.

In addition to this "look-in" feature, a continuous check is provided which enables the airplane pilot to determine at a glance as to whether or not the position of the altimeter switch is correct, i. e. if the altitude associated with the switch position as shown by numerals appearing on the face of the instrument is, at any moment, the actual airplane altitude as shown by the indicating pointer on the dial of the altimeter.

Furthermore, this altimeter switch is provided with a means for synchronizing the switch mechanism with the altimeter in the event that the two should be out of correspondence. This might be necessary, for instance, when the unit has been temporarily disabled for inspection or repair or when the altimeter is adjusted to compensate for pressure changes at ground level.

Other objects, purposes, and characteristic features of the present invention will be in part obvious from the accompanying drawings, and in part pointed out as the description of the invention progresses.

In describing the invention in detail, reference will be made to the accompanying drawings, in which like reference characters designate corresponding parts throughout the several views and in which:

Fig. 4 is a cross sectional view of the altimeter switch taken along the line 4—4 in Fig. 1;

Fig. 8 illustrates the counting mechanism shown at 9 in Fig. 1;

Figs. 13 and 14 are fragmentary views relating to the static tube for connecting the airtight altimeter case to the outside atmosphere.

In order to make the description of the structural features of the altimeter switch more meaningful, a very brief description will first be given of the main components of the device and the manner in which they operate.

Figure 1:
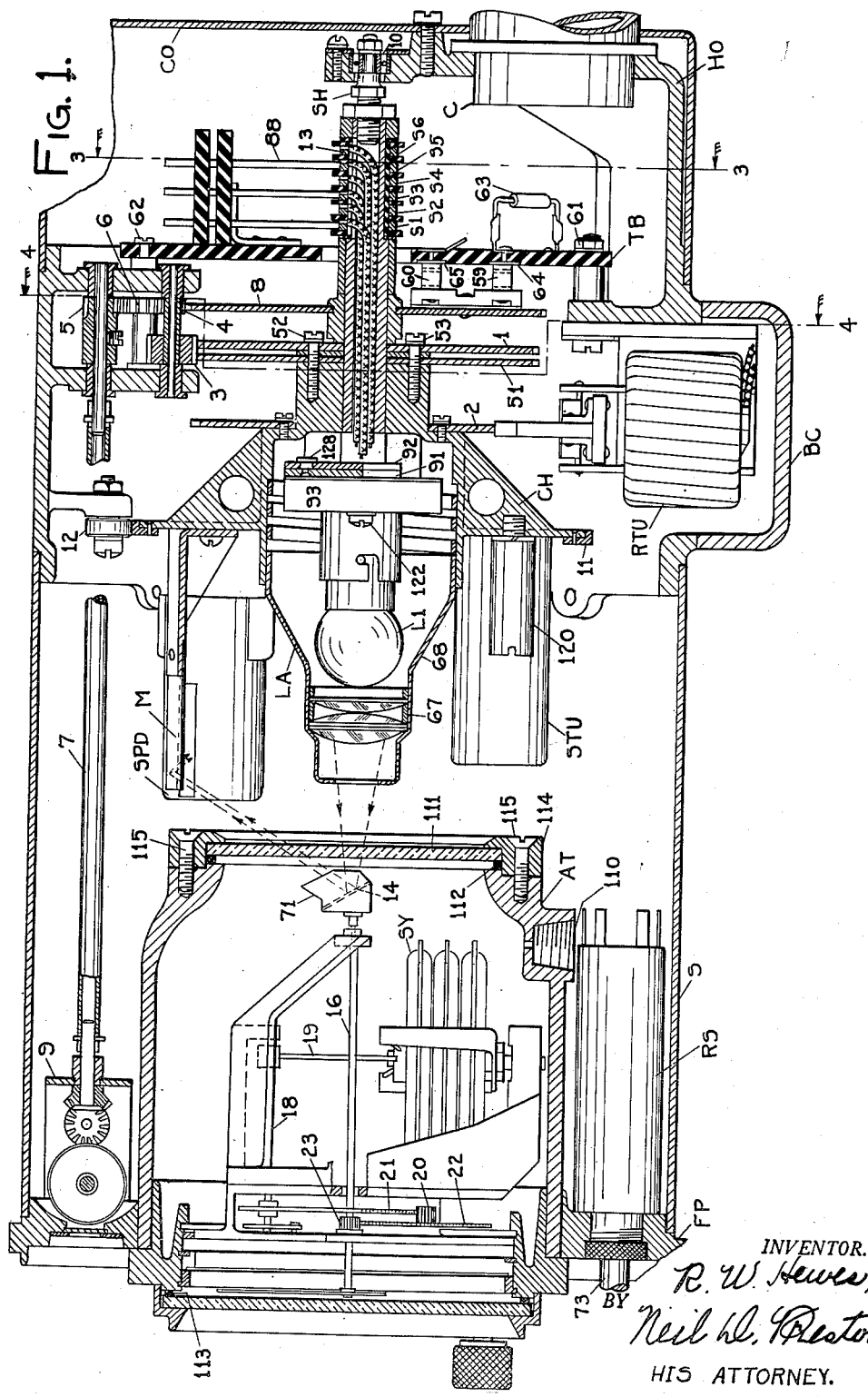
Fig. 1 is a cross sectional elevation of the altimeter switch of the present invention.

Fig. 1 illustrates that the outer covering of the altimeter switch includes the shell S, housing HO, bottom cover BC, cover CO, and front plate FP. This entire casing contains the chassis CH on which are mounted a lamp assembly LA; the various tube shields of which only two, SPD and STU, are shown in this cross sectional view; the gears 1 and 2, and the disc 51; the shaft SH which forms an extension of the chassis CH; the ratchet drive mechanism RTU; the terminal board TB; the cyclometer gear 3; pinions 4 and 5, and gear 6 which impart rotation to the shaft 7 and gear 8; the counting mechanism 9; and the rotary switch RS. Wires are brought into the interior of the altimeter assembly through the connector C.

The unit including the rotating chassis CH and shaft SH is supported at one end by the ball bearing 10 mounted in the housing HO. On the edge of the chassis CH there is mounted a ring 11 which is riveted to the chassis. This ring 11 provides a bearing surface for the other end of this rotating unit and rides against the roller bearings 12 which are provided at 120° intervals around the circumference of the ring 11. A weight 120 is attached to the chassis CH to aid in balancing this unit.

The shaft SH shown in Fig. 1 is hollow over a portion of its length and the wires forming the electrical connections from the external circuit to the various tubes and lamps on the chassis CH are carried through the hollow portion of this shaft. Each of these wires is connected to its individual slip ring such as the ones shown at 13. Six brushes such as the brush 88 are provided, one for each slip ring, and these brushes make physical contact with the slip rings 13 and thus provide connections from the external circuit to the wires contained in the shaft SH and thence to the various elements on the rotating chassis CH.

The gear 2 is fastened rigidly to the chassis CH. The driving power for rotating the chassis is provided through this gear by means of the ratchet drive mechanism RTU shown in Fig. 1.

Figure 10:
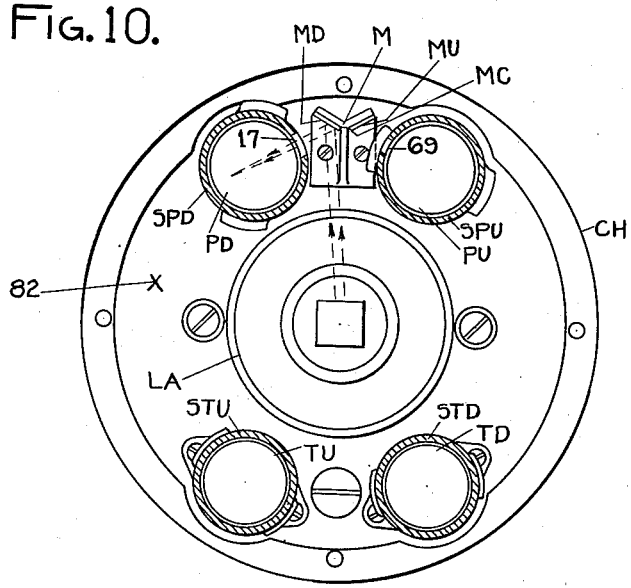
Fig. 10 is an end view of the altimeter chassis in which the tops of the shields covering the phototubes have been cut away.

A mirror 14 is located on the shaft of the usual altimeter unit AT. The light beam emitted by the lamp assembly LA shines upon this mirror and is reflected therefrom onto the mirror M. This latter mirror M (see Fig. 10) is so placed that the light beam striking it is reflected onto one or the other of the phototubes PU or PD through the slots 69 or 17 cut into the tube shields SPU and SPD, respectively, unless the light beam is shining directly upon the center, unsilvered portion MC of this mirror which is at such an angle with respect to the incident beam and the phototubes that the beam cannot be reflected onto either of the phototubes. On the other hand, if the light beam rotates, due to rotation of the shaft 16 of the altimeter unit AT, and impinges upon the face MU of the mirror, the light beam will be reflected through the slot 69 cut into the shield SPU and will impinge upon the phototubes PU. This reflection of the light beam is shown in Figs. 1 and 10. Fig. 1 illustrates the manner in which a light beam emanating from the lamp assembly LA is reflected by the mirror 14 located on the end of the altimeter shaft 16. This reflected beam then impinges upon the mirror M from whence it is reflected into the slot 69 cut into the shield SPU. Fig. 10 more clearly illustrates the particular angles that the faces of this latter mirror M makes with respect to the incident beam and the slots cut into the shields covering the phototubes. In this view the top of each shield has been shown cut away so as to show the position of the above-mentioned slots. The source of the light beam is not shown as the mirror 14 does not appear in this view.

When the light beam impinges upon either of the phototubes in the manner described the particular thyratron associated with that phototube fires or conducts and this, in turn, so actuates the ratchet drive mechanism RTU as to cause it to revolve the gear 2. For example, if the light beam impinges upon the face MU of the mirror M as shown in Fig. 10 and is reflected onto phototube PU, the ratchet drive mechanism RTU will be so actuated as to cause clockwise rotation of the chassis CH. In effect, the altimeter switch chassis CH revolves in such a direction that the particular phototube upon which the light beam has been shining tends to keep just ahead of the light beam.

In summary then, it may be said that when the light beam shines upon the center or "dead" spot of the mirror M, neither thyratron tube is energized and the altimeter switch chassis CH is stationary. If however, the light beam rotates, the chassis is caused to rotate in the same direction so that, in effect, the light beam tends to remain between the phototubes and tends to impinge upon the unsilvered portion MC of the mirror M. By this means, the chassis CH "follows" the rotation of the altimeter shaft 16 so that various switch contacts may be placed thereon and thereby cause an external circuit to be sensitive to changes in altitude but without the requirement that additional torque be developed by the shaft of the altimeter.

Figure 2:
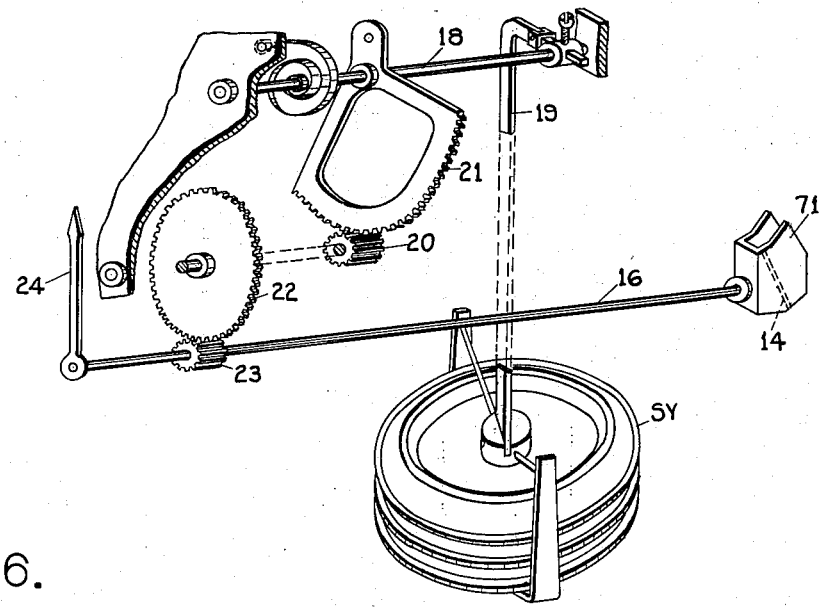
Fig. 2 is an expanded view of the mechanism which causes rotation of the shaft of the altimeter.

Fig. 2 illustrates, in an expanded view, the manner in which variations in atmospheric pressure result in rotation of the altimeter shaft 16. An evacuated Sylphon SY is shown which collapses with increase of barometric pressure and expands when the pressure decreases. The action of this Sylphon is transferred to the shaft 18 by means of the lever 19. The movement of this upper shaft causes the pinion 20 meshing with the quadrant gear 21 to rotate. This rotation causes the gear 22 on the same shaft as the pinion 20 also to revolve. Meshing with the gear 22 is the pinion 23 on the main shaft 16 of the altimeter. It is evident, therefore, that only slight rotation of the upper shaft 18 is required in order to produce an appreciable rotation of the lower shaft 16. In this manner, slight variations in atmospheric pressure are observable by rotation of the altimeter shaft 16 and corresponding movement of the indicator 24. The altimeter of the present invention is so constructed as to make one complete revolution of the shaft 16 for each one thousand feet change in altitude.

Figure 13:
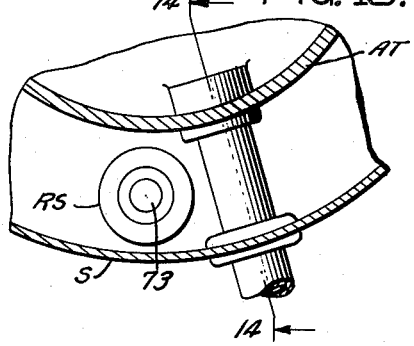

Fig. 1 shows that a glass cover 111 is provided over the end of the altimeter unit AT and that this cover 111 forms an airtight seal by reason of the gasket 112 and the fastening ring 114 which is mounted onto the main portion of the altimeter unit AT by screws 115. An additional gasket 113 is provided to make an airtight cell for the other end of this unit AT. Also a vent hole is provided at the base of the threaded opening 110 and a corresponding hole (see Figs. 13 and 14) is provided in the shell S so that one end of a static tube 109 may be brought through this opening in the shell S and screwed into the opening 110. By means of this structure, the altimeter unit will not be affected by the air pressure surrounding the outside of its case and will, therefore, record only the pressure transmitted to it through the static tube. Thus, this unit may conveniently be used in aircraft having pressurized cabins for the pressure recorded by the altimeter will thus actually be the atmospheric pressure corresponding to the actual altitude of the aircraft and not the pressure artificially maintained in the interior of the aircraft.

Figure 9:
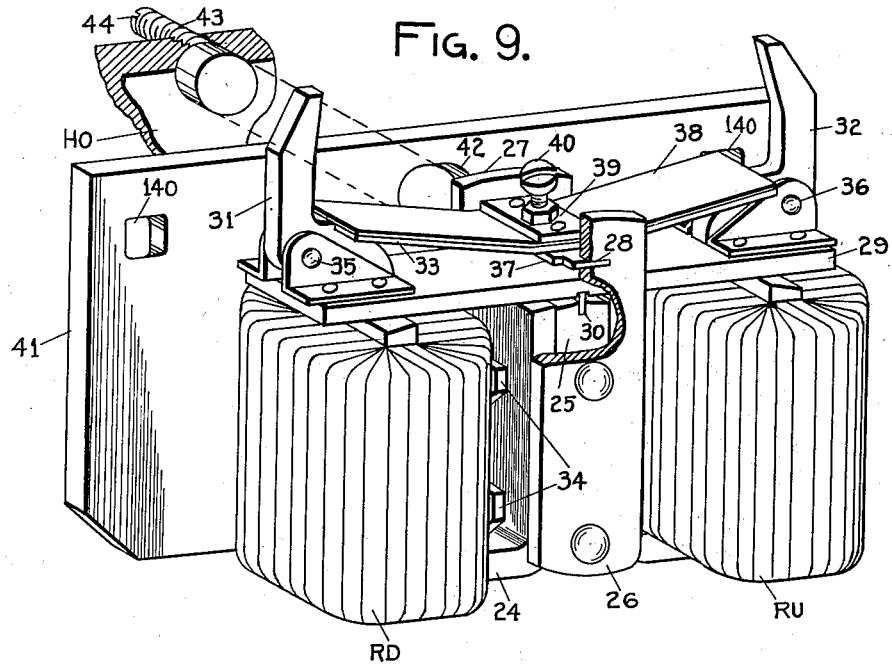
Fig. 9 is a perspective view of the ratchet drive mechanism shown at RTU in Fig. 1.

The driving mechanism RTD which produces rotation of the altimeter switch chassis CH is shown in the sectional view of Fig. 1 and is shown again in the perspective drawing of Fig. 9. Another view of this mechanism is shown in Fig. 4 in which the relationship between this driving mechanism and the gear 2 which it drives is clearly shown. In this latter figure the U-shaped core 24 about which the winding RD is placed is shown in the cut away view. There is a similar core, of course, for the left-hand portion. These cores are assembled with the mounting block 25 in between as shown in Fig. 9 and bolts 34 are provided to hold this mounting block 25 and the two U-shaped cores together. Straps 26 and 27, each provided with a slot as at 28 are riveted to the block 25. The U-shaped core pieces 24 and armature 29 are formed of a magnetic material.

Referring still to Fig. 9, the armature 29, provided with a slot cut into its bottom surface, is shown as being pivoted upon the bearing 30 which fits into the corresponding slot cut into the mounting block 25. At each end of this armature, there is mounted a ratchet 31 and 32 which pivots about the pins 35 and 36, respectively, inserted through them. The lower plate 37, spring 38, restraining plate 33, and upper plate 39 are riveted together as shown. The restraining plate 33 has two arms extending on each side of its center portion which arms extend the length of the spring 38 and are relatively rigid. The space between these arms at each end is sufficiently wide, however, so that the ratchets 31 and 32 are in contact with the spring 38 and not with these arms of plate 33. The lower plate 37 has two extending tongues, one at each end, which tongues are received by their respective slots in the straps 26 and 27, so as to support the spring biasing structure independently of the armature 29.

The screw 40 passes through the plates 33, 37, 39, and spring 38, and has its lower end closely adjacent the armature 29. By this means, proper contact between the armature 29 and bearing 30 is assured.

With this arrangement of parts, the spring 38 not only provides a restoring force upon the armature 29 so as to cause it to return to its neutral position when the windings RU and RD are deenergized, but also tends to hold the ratchets 31 and 32 from pivoting outwards about the pins 35 and 36 inserted through them. The function of the extending arms of plate 33 is to positively position the spring 38 and thus stabilize the position of the armature when it is in its neutral position. The purpose of the upper plate 39 is to secure the center portion of the spring 38 firmly to the lower plate 37 so that the center of the spring will not rock about this lower plate 37.

This entire unit comprising the ratchet drive mechanism RTD is mounted on a plate 41. When this plate 41 is mounted against the housing HO by means of screws passing through the holes at 140 in plate 41, the eccentric 43 fits into the slot at 42 in plate 41. Thus, by merely turning the eccentric with a screw driver inserted in the screw-driver slot 44 of the eccentric 43, the position of the complete ratchet drive mechanism RTD may be moved upward or downward as required.

The ratchet drive mechanism RTD shown in Figs. 1, 4, and 9 permits the gear 2 to be rotated in either a clockwise or counter-clockwise direction, the particular direction of rotation depending upon which of the windings RU or RD is energized. Thus, it is shown in Fig. 4 that if the winding RD is energized, the right end of the armature 29 will be attracted toward the core piece 24 about which that winding RD is wound. As a result, the left-hand end of the armature will be raised and the ratchet 32 will push upward the gear tooth with which it is engaged thereby imparting clockwise rotation to the gear 8. Counter-clockwise rotation results from energization of the other winding RU.

When the winding RD is deenergized, the armature 29 is restored to its normal, horizontal position by the restoring force exerted upon it by the spring 38. In order for the ratchet 31 to clear the next lower gear tooth, however, it must, during the time that it is traveling to its normal position, pivot outwardly against the restraining force of the spring 38. As soon as it has cleared that particular gear tooth, the spring 38 forces the ratchet 31 back to its normal position so that the upper tip of the ratchet will again be in such a position as to enable it to engage the next lower gear tooth when the winding RD is again energized.

To prevent the gear 2 from being rotated back to its original position by the downward movement of the ratchet, a detent 45 is provided which exerts sufficient force against the turning of the gear 2 during the time that the ratchet is being restored to its neutral position to enable the gear to remain stationary and to cause, instead, the pivoting of the ratchet as described. This detent is mounted by means of the screws 46 to a web on the housing HO which web does not appear in the sectional view of Fig. 4. The arm 47 on the detent pivots about the pin inserted through it and the mounting bracket. A pin 48, inserted through the arm 47, rides on the teeth of gear 2 and is held in position by the spring 50 thus providing the required force to restrain rotation of the gear 2 under the conditions outlined above. By turning the knob 49, the force on the spring 50 and thus of the pin 48 against the gear 2 may be varied as required.

The rate at which the previously described operation, i. e. the pushing up of a gear tooth with which the ratchet is engaged and the restoration of the ratchet to its normal position, occurs is dependent upon the rate at which the winding of the ratchet drive mechanism is energized. Obviously, one complete cycle of operation of the drive mechanism is effected by one energization of a winding and its subsequent deenergization. Therefore, if the windings are supplied with a pulsing, unidirectional current, the rate of the operation is determined by the rate at which such pulses are generated. This source of energy has been shown in block form in Fig. 11 as a "pulse generator." A multivibrator may, of course, be conveniently used for this purpose.

Figure 6:
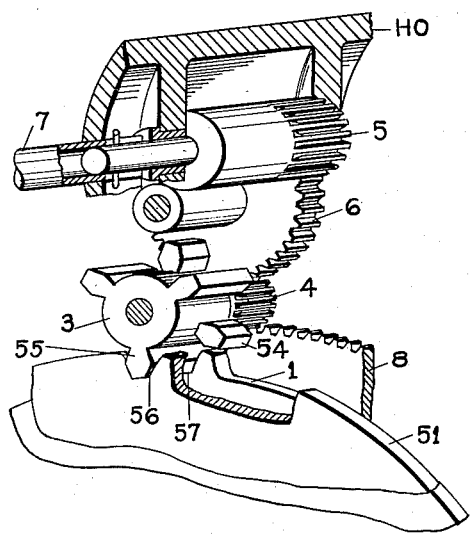
Fig. 6 is a perspective view of the gear train which transfers the rotation of the altimeter chassis to movement of the counting unit shown at 9 in Fig. 1 and to the gear 8 shown in Fig. 1.
Figure 7:
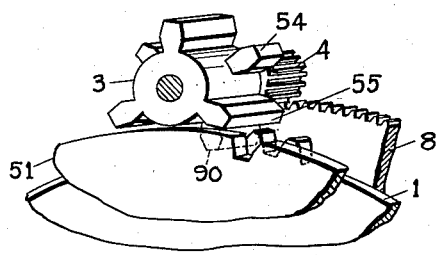
Fig. 7 is a perspective drawing of the cyclometer gear and the disc and gear with which it engages, shown at a time when the cyclometer gear is not meshing with either the gear or disc.

It is clearly shown in Fig. 1 that the slotted disc 51 and the two-toothed gear 1 are fastened together and also to the chassis CH by the screws 52 and 53 so that they revolve with the chassis CH. The gear and disc react with the cyclometer gear 3 in a manner which is more clearly brought out in Fig. 6. This arrangement is, however, typical of those in which cyclometer gears are provided. Thus, during each revolution of the two-toothed gear and disc one or the other of the teeth on the gear 1, depending upon the direction of rotation, engages one of the half-teeth such as the half-tooth 54 on the cyclometer gear. As a result, the cyclometer gear 3 is revolved to such a position that one of the whole teeth 55 of the cyclometer gear is then engaged by the notch 56 on the disc and the space 57 between the two teeth of the gear 1 which notch and space are always opposite each other. When the gear and disc have rotated further as shown in Fig. 7, the whole-teeth on the cyclometer gear 3 clear the edge of the disc but one of the half teeth 90 is then in a position which will allow it to be engaged by a tooth in the gear 1 when those gear teeth are again in position to do so. As a result, the cyclometer gear makes one-third of a complete revolution for every revolution of the chassis CH.

Figure 12:
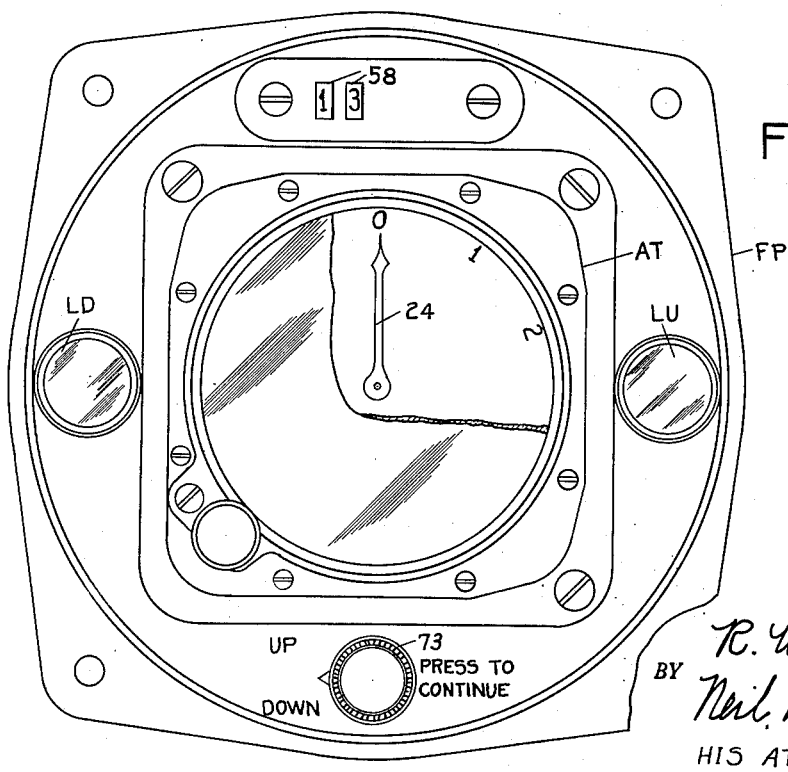
Fig. 12 is a front view of the complete altimeter switch showing the control knob 73 of the rotary switch RS and the various indicating devices.

Meshing with the pinion 4 on the end of the cyclometer gear 3 is a train of gears 5 and 6. As can be seen in Fig. 1, the upper shaft 7 which is only partially shown in Fig. 6, extends nearly to the front of the altimeter switch. At this point it is geared to a counter 9 of the type shown in Fig. 8. This counter is of the conventional type and is so related in its operation to the cyclometer gear 3 that it records one additional unit on its dial for each one-third of a revolution of the cyclometer gear. Thus, the counter, in effect, counts one unit for each revolution of the altimeter chassis CH and, since each revolution of the chassis represents a one thousand foot change of altitude, the number of the counter 9 which appears through the window 58 on the face of the instrument as shown in Fig. 12 represents the aircraft altitude in thousands of feet.

Also meshing with the pinion 4 is the gear 8 which is free to rotate with respect to the shaft SH as shown in Fig. 1. This gear 8 is provided with two contacts 59 and 60 which brush against suitable contacts on the terminal board TB. This terminal board is mounted on the housing HO by means of screws such as at 61 and 62, and is formed of an electrically insulating material.

Figure 3:
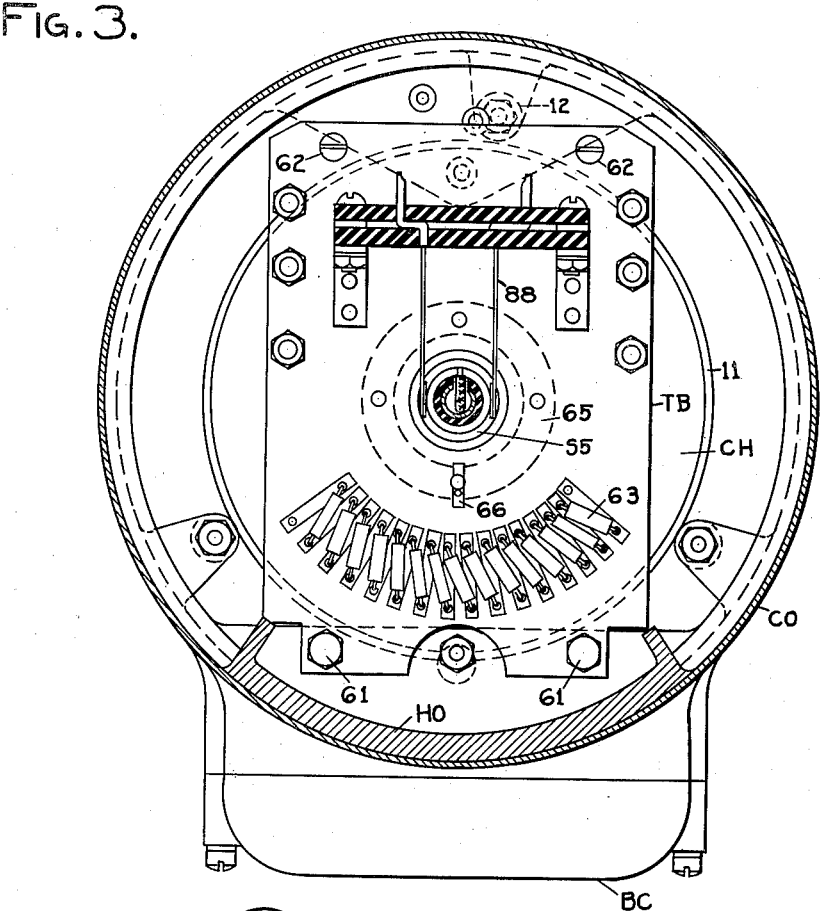
Fig. 3 is a cross sectional view of the altimeter switch taken along the line 3—3 in Fig. 1.

Fig. 3 shows that there are mounted on the terminal board TB a number of resistors 63. These are connected in series and with each junction between each of the resistors connected to a contact such as contact 64 on the other side of the terminal board TB as shown in Fig. 1. The contact 59 is in contact with one of the contacts 64 on the terminal board, the position of contact 59 depending, of course, on the altitude of the airplane as will presently be made clear. The contact 59 on the gear 8 is electrically connected to the contact 60 on the same gear and this latter contact continually brushes against the conducting ring 65 mounted on the terminal board TB as shown in Fig. 3. A terminal 66 provides for the making of an electrical connection to this ring. By means of this arrangement, an electrical connection is provided from this terminal 66, through the ring 65 and contact 60 to contact 59 and thence to the particular contact on the terminal board which is, at that moment, opposite the contact 59 on the gear 8. A potentiometer arrangement is thereby provided by this circuit. This potentiometer is shown diagrammatically in Fig. 9B of the Kendall and Orpin application Ser. No. 743,046, filed April 22, 1947, which is now U. S. Patent No. 2,588,930 granted March 11, 1952, and is employed for the specific purposes given in detail in that application. Its general function is, however, as previously described, i. e. to cause signals to be transmitted from the aircraft which are distinctive of the altitude at which it is flying.

With respect to the light beam which is employed to actuate the phototubes, Fig. 1 shows that the light emitted by the incandescent lamp L1 is made to converge by reason of the lens system 67 mounted in the barrel 68. This light beam, after passing through the glass cover 111, strikes the mirror 14 which is tilted at such an angle as to reflect the light beam onto the mirror M.

Figure 5:
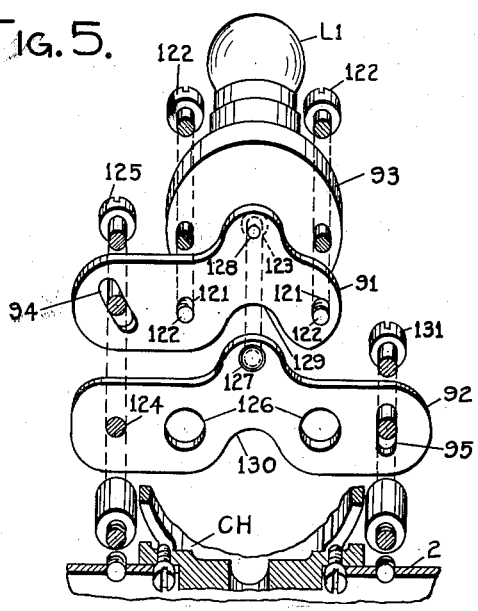
Fig. 5 is an exploded view of the assembly constituting the mounting of the lamp L1 shown in Fig. 1.

Fig. 5 shows in an exploded view the manner in which the lamp assembly LA is mounted onto the chassis CH. Thus, plates 91 and 92 are shown between the lamp base 93 and the chassis CH. Plate 91 is provided with a slot at 94 and three holes. Two of these holes 121 are tapped so that the lamp base 93 can be mounted thereto by screws 122. The slot 94 lies along the arc of a circle having its center at the hole at 123 so that this plate 91 is free to pivot about the hole 123. Plate 92 is provided with a hole at 124 whereby the screw 125 can pass through the slot 94 in plate 91 and through this hole at 124 in plate 92. Two additional holes at 126 are provided in plate 92 so that the plate 91 can be moved relative to plate 92 without interference from the projecting ends of the screws 122. A hole 127 is located in the plate 92 so that plate 91 may be fastened to plate 92 by means of a rivet 128 and yet be free to rotate about the hole at 123. The slot 95 in plate 92, through which screw 131 passes, lies along a circular arc having its center at 124 so that plate 92 can pivot about this hole 124. Indentations have been formed in plates 91 and 92 at 129 and 130, respectively, for the purpose of allowing wires (not shown in this view) to be brought from the chassis CH to the bulb L1. By means of this arrangement, the pivoting of either of these plates 91 or 92 causes the bulb to move along a circular arc, the movement caused by pivoting one plate being substantially at right angles to the movement produced by pivoting of the other plate, whereby the lamp L1 can, over a limited area, be adjusted to any desired position. Thus merely by tightening screws 125 and 131, the lamp L1 may be securely held in that position. Thus, a convenient means is provided for adjustment of lamp L1.

The mirror 14 is provided with a shield 71 which reduces the diffusion of the focussed beam. The mirror M is also shown in Fig. 10 and in this latter view it can be seen that the mid-portion MC of this mirror is at such an angle to an incident beam from the mirror 14 that a light beam impinging upon it cannot be reflected into either of the slots 69 and 17 shown as having been cut into the sides of the shields SPU and SPD, respectively. If, however, the light beam impinges upon the face MU of the mirror M, it will be reflected directly onto the phototube PU through the slot at 69. A description will now be given of the circuit which is employed which will cause the entire chassis CH to revolve when a light beam is reflected onto one of the phototubes.

Figure 11:
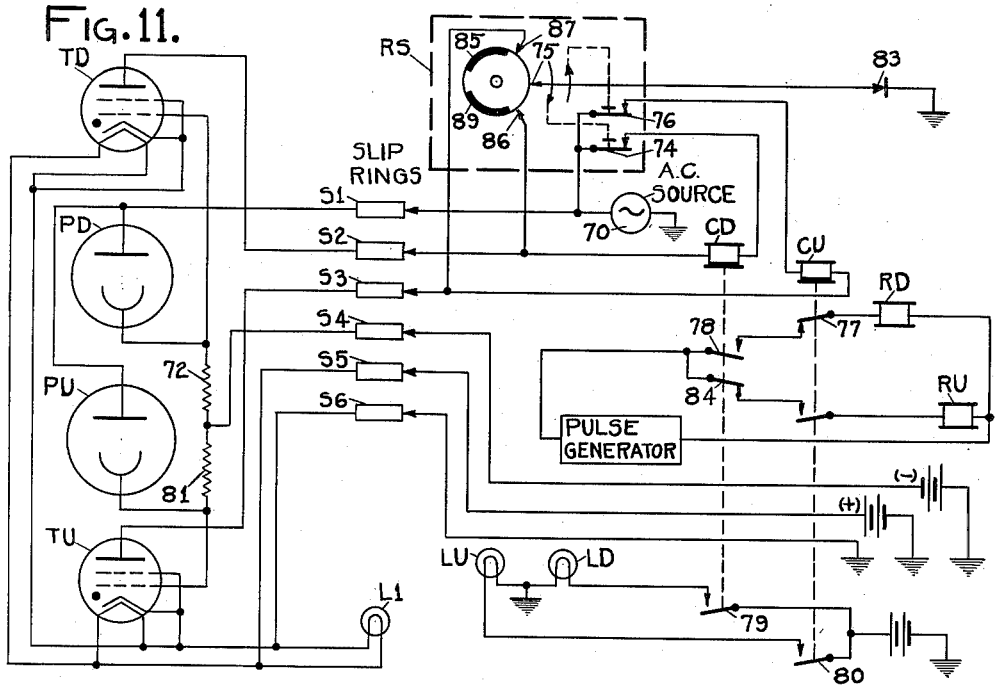
Fig. 11 is a circuit diagram of the circuit employed in the altimeter switch of the present invention.

Fig. 11 indicates the various connections which are made from the external circuit to the thyratrons, phototubes, and lamp L1 over the slip-rings located on the shaft SH of the chassis CH. In addition to these various components mounted on the altimeter chassis, the control circuit for the altimeter switch includes the control relays CU and CD, the rotary switch RS, the windings RU and RD of the ratchet drive mechanism and the incandescent lamps LD and LU. The control relays CU and CD may be of any conventional type and, since they are mounted exterior to the altimeter assembly, they are shown only diagrammatically in the drawings.

The thyratron tubes TU and TD are indirectly heated by means of the connections made over the slip-rings S5 and S6 to the heaters of these tubes. One side of the heaters is indicated as being connected to ground and the cathode and shield grid of each thyratron are connected to this grounded wire. Included in the heater circuit for the thyratron tubes is the incandescent lamp L1.

The plate of each thyratron tube is connected through a slip-ring, control relay winding, and a normally closed contact of rotary switch RS to an alternating current source 70. The frequency of this alternating-current source is preferably higher than the usual power frequencies and the alternating-current dynamotor commonly used on aircraft may conveniently be employed for this source of power. The control grid of each thyratron is connected to a resistor having a large value of resistance. The junction of these resistors is then connected through a slip-ring to a source of negative, direct-current voltage. Each thyratron control grid is also connected to the cathode of a phototube. Thus, the control grid of thyratron TD, for example, is shown as having connected to it one end of resistor 72 and the cathode phototube PD. The anode of each of these phototubes is connected through a slip-ring to the alternating current source 70.

The rotary switch RS shown diagrammatically in Fig. 11 is of the type in which rotation of the knob 73 (see Fig. 12) through 90° in a clockwise direction will move commutator segment 85 to such a position as to complete a circuit between contacts 75 and 87 and a 90° rotation from the neutral position in the counterclockwise direction will move segment 89 into such a position as to close a circuit between contacts 75 and 86. In addition, the knob 73 on the switch RS may be pushed in against the restoring force of a spring after it has been turned to either of the positions described above. For instance, if the knob has been turned clockwise 90° from its neutral position, the knob may be pressed in, in which case front contact 74 is opened. Similarly, if the knob has been turned 90° counterclockwise from its original position, pushing in the knob will open front contact 76. Of course, as soon as the knob is released, these front contacts are again closed. This operation of the switch RS has been diagrammatically illustrated by means of the arrows which signify rotation of the knob 73 in a certain direction and the dashed lines which indicate the particular contact that can be opened by pressing the knob 73.

The windings RU and RD of the ratchet drive mechanism RTD are included in a circuit which contains a front contact of one control relay and a back contact of the other control relay. Winding RD has in series with it, for example, a back contact 77 of control relay CU and a front contact 78 of control relay CD. Obviously, in order for winding RD to be energized, control relay CD must be picked up and control relay CU must be dropped away. If both control relays CU and CD are simultaneously energized, or if both of these relays are simultaneously deenergized, neither winding RU or RD can be energized.

Front contacts 79 and 80 of relays CD and CU, respectively, control the operation of incandescent lamps LD and LU. Thus, if control relay CU is picked up, lamp LU is illuminated. Similarly, lamp LD is illuminated by the picking up of control relay CD. As will later be made clear, both control relays CU and CD can be simultaneously picked up under certain conditions and when this occurs, both lamps LU and LD are illuminated. Having thus generally described the structural features of the present invention, further description will now be given from the standpoint of its operation. It will first be assumed that the light beam reflected by the mirror 14 is impinging upon the center unsilvered portion MC of the mirror M shown in Fig. 10. In that case, both of the phototubes will be dark and will not conduct. Consequently, these tubes will each have the effect of a very high value of resistance in the grid circuit of the associated thyratron tube. Therefore, the amount of resistance of each resistor 72 and 81 is relatively small as compared to that of the phototubes and the grid of each thyratron will, therefore, assume a negative potential with respect to its cathode. Neither thyratron TU nor TD will conduct current under these conditions. It should be noted here that, although thyratrons have been employed in this embodiment, other suitable amplifiers might as well have been used.

If now the shaft 16 of the altimeter rotates so as to cause the light beam to shine upon the face MD of the mirror M in Fig. 10, this light beam will be reflected onto the cathode of the phototube PD and will cause that tube to conduct during each half cycle that its plate is driven positive with respect to its cathode. When this phototube PD conducts, its effect in the grid circuit of thyratron TD is that of a small resistance as compared to the resistance of the resistor 72. This action causes the control grid of the thyratron TD to become less negative with respect to its cathode and this thyratron then conducts during each half cycle that its plate is positive with respect to its cathode. As a result, current flows in the plate circuit of this tube over slip-ring S2, the windings of control relay CD, front contact 74 of rotary switch RS, to the alternating current source 70, and thence to ground. As a result, control relay CD will be picked up so as to close its front contact 78 and the winding RD of the ratchet drive mechanism RDT will be energized, causing the altimeter chassis CH shown in Fig. 10 to rotate in a counter-clockwise direction. Of course, the lamp LD will be illuminated as long as control relay CU is picked up as has already been explained. The circuit for the winding RD will be maintained until the light beam no longer shines upon the mirror MD i. e. until the light beam is again impinging upon the center portion of the mirror so that it cannot be reflected onto the phototube PD.

Because the thyratron tubes TD and TU do not conduct during the half cycle when their plates are negative with respect to their cathodes, these tubes act as half-wave rectifiers. Thus, although the current through the winding of each control relay is unidirectional, it is, nevertheless, intermittent and for this reason these relays have been provided with sufficiently slow release characteristics to enable them to remain picked up despite the intermittent nature of their energization.

If the position of the altimeter switch chassis CH does not correspond with the actual altitude, the proper correspondence may be obtained by operation of the rotary switch RS shown in Fig. 11. Thus, assuming for the moment that the light beam is impinging upon the spot marked X at 82 in Fig. 10, rotating the knob of the rotary switch RS 90° in the counter-clockwise direction will close a circuit between contacts 75 and 86 and will shunt the thyratron TD. Instead of the normal energization circuit for control relay CD as described above, the circuit for the winding of this relay will now be from ground, the alternating current source 70, front contact 74 of rotary switch RS, the winding of control relay CD, contact 86, commutator segment 89, contact 75, rectifier 83, to ground. The rectifier 83 is included in the circuit in order to provide the half-wave rectification ordinarily performed by the action of the thyratron tube TD. The picking up of control relay CD will cause counter-clockwise rotation of the chassis CH as just described.

As the chassis CH continues to rotate in a counter-clockwise direction, the light beam will first impinge upon the face MD of the mirror M and this will cause the thyratron TD to fire. However, this action will have no effect upon the circuit since the thyratron TD is now being shunted by the above-described circuit through the rotary switch RS. However, when the chassis CH has rotated further counter-clockwise so that the light beam now impinges upon the face MU of the mirror M, thyratron TU will fire and control relay CU will be picked up. With both of the control relays picked up, neither winding RU nor winding RD of the ratchet drive mechanism RTD can be energized as explained above and the chassis CH will, therefore, cease to rotate. At the same time, front contacts 79 and 80 of the control relays CD and CU, respectively, will be closed so that both incandescent lamps LD and LU will be illuminated thereby giving a visual indication on the face of the altimeter that the altimeter switch is in correspondence with the altimeter itself.

As soon as the rotary switch RS is rotated back to its neutral position, thyratron TD will no longer be shunted and control relay CD will drop away but, since the light beam is still shining upon the face MU of the mirror, control relay CU will remain picked up. With relay CD dropped away and relay CU picked up, winding RD will be momentarily energized so as to cause the chassis CH to rotate in the clockwise direction until the light beam no longer shines upon the face MU but shines instead upon the center, unsilvered portion MC of the mirror M.

If it is desired to look into another altitude, this may be done by first rotating the knob 73 of the rotary switch RS and then pushing it in. Thus, if the pilot wishes to look into the next higher altitude, he first turns the knob 73 in the clockwise direction through 90° and then pushes the knob in. Reference to Fig. 11 shows that the clockwise rotation of the knob 73 causes segment 85 to close a circuit between contacts 75 and 87 and thereby shunt thyratron TU. A circuit is thus provided to energize the winding of control relay CU and will result in clockwise rotation of the altimeter chassis CH. However, after the chassis has rotated through only a very small angle, the light beam, assuming that it is stationary, will impinge upon the face MD of the mirror M and will result in the picking up of control relay CD and, as previously described, rotation of the chassis CH cannot occur if both control relays are picked up. If, however, the knob 73 of the rotary switch RS is now pushed in, front contact 74 will be opened so that control relay CD will be deenergized and drop away. The dropping away of this relay will cause its back contact 84 to close so that winding RD may be energized and allow the chassis CH to rotate further in the clockwise direction. Once the chassis CH has rotated clockwise far enough so that the light beam can no longer impinge upon the face MD of the mirror M, the knob 73 may be released in which case it will return to its outward position and close its front contact 74. The chassis CH will still continue to rotate and the situation is then similar to that described above for, when the chassis has made a complete revolution and the light beam again strikes the face MD of the mirror, the control relay CD will again be picked up and this will result in the deenergization of winding RU. If, however, the knob is held pushed in, the chassis CH will not stop after one revolution for then the control relay CU cannot be picked up and the chassis will, consequently, continue to rotate.

In summary then it may be said that, when the position of the chassis CH does not correspond to the actual altitude of the plane, the two may be brought into correspondence simpley by rotating the knob 73 of the rotary switch RS in the desired direction. In addition, even though the position of the chassis does correspond to that of the light beam, it may be desirable to have the altimeter switch chassis CH indicate an altitude one or more thousand feet higher or lower than it actually does, in which case it is necessary only to rotate the knob 73 in the desired direction and press it in momentarily. The chassis CH will then make one complete revolution and then synchronize its rotation at that other altitude with the rotation of the shaft 16 of the altimeter unit AT. If the knob 73 is held in, the chassis CH will continue to rotate. When the knob 73 is released, the chassis will continue its rotation only until the light beam again impinges upon a face of the mirror M. As soon as the chassis CH has been rotated to its desired position, the knob 73 should be rotated back to its original, neutral position.

Although a ratchet mechanism has been disclosed as providing the driving torque for the rotating chassis, it should be understood that other sources of power such as a motor might also be readily employed. Also, although phototubes have been shown for the light sensitive elements, any other device responsive to light such as a selenium cell might be used.

Having described an altimeter switch as one specific embodiment of the present invention, it is desired to be understood that this form is selected to facilitate in the disclosure of the invention rather than to limit the number of forms which it may assume; and it is to be further understood that various modifications, adaptations, and alterations may be applied to the specific form shown to meet the requirements of practice, without in any manner departing from the spirit or scope of the present invention.

What I claim is:

1. In a circuit controlling device operated in accordance with changes in altitude, an altimeter having a shaft rotated to different altitude positions in accordance with changes in altitude, a rotatable contact carrying chassis mounted with its axis coincident with the axis of said shaft, two photoelectric circuit elements mounted adjacent each other near the rim of said chassis, an inclined mirror mounted at the axis of said shaft and rotated therewith for causing a light beam to describe a circular path along the rim of said chassis, two slightly spaced mirrors attached to said chassis and located between said two photoelectric circuit elements at such angles with respect to each other that a light beam from the center of said chassis falling on one mirror is reflected to one photoelectric element and falling on the other mirror is reflected to the other photoelectric circuit element, an incandescent lamp and light focusing means mounted at the center of said chassis for causing a beam of light to fall on said inclined mirror, slip rings mounted upon said chassis for making connections from the circuit elements mounted upon said chassis to external control circuit means, and electromechanical means governed by said external control circuit means for imparting clockwise rotation to said chassis when said light beam impinges upon the light sensitive portion of one of said photoelectric circuit elements and for imparting counter-clockwise rotation to said chassis when said light beam impinges upon the light sensitive portion of the other of said photoelectric circuit elements, whereby said traveling light beam tends to impinge upon said space between said two mirrors attached to said chassis.

2. In a circuit controlling organization operated in accordance with changes in altitude: two light sensitive elements mounted on a movable device, an altimeter operating a mirror located adjacent said movable device at its axis for directing a beam of light into the path of movement of said light sensitive elements; two thyratrons; two control relays; an electromagnetic drive mechanism having two windings on an electromagnetic structure and having a ratchet drive mechanism operatively connected to said movable device; a rotary switch; circuit means including a source of biasing potential and a grid-cathode resistor associated with each of said thyratrons; control circuit means including a source of energy for connecting said two light sensitive elements to the control grids of said thyratrons; circuit means for each control relay including the plate-cathode circuit of its thyratron tube, the winding of that control relay, a normally closed contact of said rotary switch, and a source of alternating current; circuit means for energizing each one of said windings of said electromagnetic drive mechanism including a front contact of one control relay, a back contact of the other control relay, and a source of pulsing unidirectional current; whereby the incidence of a light beam upon the light sensitive element of one of said phototubes causes the firing of a thyratron tube associated with said phototube, the picking up of one of said control relays, and the energization of one of said windings of said electromagnetic drive mechanism, and whereby the incidence of said light beam upon the other of said phototubes causes energization of the other of said windings in a similar manner.

3. In a circuit controlling organization operated in accordance with changes in altitude, an altimeter mechanism, an airtight case for said altimeter mechanism, an opening in said airtight case, a static tube leading from said opening and with its other end open to the atmosphere the pressure of which is to be measured, a rotatable shaft in said airtight case rotated by said altimeter mechanism in accordance with pressure changes of said atmosphere, a mirror mounted on the end of said shaft and at an angle with said shaft, a plate of transparent material forming an end of said airtight case adjacent said mirror, a rotatable chassis adjacent said altimeter mechanism at that end having said transparent plate, optical means including a source of light and a lens system for causing a beam of light to be reflected from said mirror through said plate of transparent material so that said reflected beam describes a circular path upon said rotatable chassis, and electromechanical means exterior to said airtight case including two photoelectric circuit elements responsive to said reflected light beam for producing rotation of said chassis in a manner governed by the movement of said light beam, whereby said rotating chassis "follows" said rotating shaft without having said altimeter mechanism affected by ambient pressures.

4. In a circuit controlling organization operated in accordance with changes in altitude, a rotatable chassis, two light sensitive elements mounted on said chassis, an altimeter operated mirror located on the axis of said rotatable chassis for directing a beam of light into the path of movement of said light sensitive elements at positions corresponding to the existing altitude, an electromagnetic drive mechanism operatively connected to said rotatable chassis for operating it in opposite directions depending upon which of its two windings are energized, a thyratron and a control relay associated with each direction of rotation of said chassis, each control relay governing the operation of said drive mechanism for the corresponding direction, circuit means connecting each light sensitive element with its corresponding one of said thyratrons, a control circuit for each control relay including a source of energy and a plate circuit of its corresponding one of said thyratrons, a rotary switch having two normally open contacts one of which is closed when said switch is rotated in one direction and the other of which is closed when said switch is rotated in the opposite direction, said rotary switch also having a normally closed contact for each rotated position which can be opened only when said switch has first been rotated in the proper direction, an additional energizing circuit for each control relay including one of said normally open contacts and the normally closed contacts for the opposite position of said rotary switch, whereby the rotation of said switch in either direction energizes the control relay associated with the corresponding direction of rotation of said chassis and the subsequent pressing in of said knob makes impossible the energization of the control relay by said thyratron for the opposite direction of rotation of said chassis.

5. In a device for controlling a circuit in accordance with changes in altitude, a terminal board made of electrical insulating material mounted in a fixed position, a number of contacts evenly spaced in a circular arc upon said terminal board, a resistor connecting each of said contacts to its adjacent contact thereby forming a series circuit of said resistors, a circular conducting ring mounted on said terminal board concentric to said circular arc of contacts, a circular rotatable member having its axis on the same line as the center of said circular arc of said contacts, two electrical contacts connected together and mounted upon said circular rotatable member at radii corresponding to the radius of said circular arc of contacts and to the radius of said conducting ring, electrical connections to each end terminal of said series circuit of resistors and to said circular conducting ring, and an altimeter acting to control the rotation of said circular rotatable member, whereby a variable potentiometer is provided in which the electrical resistance from said circular conducting ring to said conductor at either end terminal of said series circuit of resistors may be varied by rotating said circular rotating member.

6. In a ratchet drive mechanism, a rotatable gear having symmetrical teeth about its circumference, a mounting block adjacent to and below said gear, said mounting block having a rectangular slot cut longitudinally into its upper surface, a bearing member of rectangular cross section fitted into said slot in said mounting block, an armature of magnetic material having a transverse slot across the midportion of its bottom surface and mounted with its slot fitting over said bearing member, two U-shaped core pieces of magnetic material mounted with one leg of each of said U-shaped pieces against opposite faces of said mounting block and with the other leg of each of said U-shaped pieces adjacent an end of said armature, a winding associated with each of said core pieces, a spring biased ratchet mounted on each end of said armature with the upper end of each of said ratchets normally making contact with a tooth on said gear, a detent associated with said gear for preventing free rotation of said gear, whereby the energization of one of said windings attracts the end of said armature adjacent said energized winding thereby disengaging the ratchet at the attracted end of said armature from its associated gear tooth at the same time that the other end of such armature is moved away from its associated winding whereby the ratchet at such other end of said armature forces upward the gear tooth with which it is in contact thereby imparting rotation to said gear, and whereby energization of the other of said windings imparts rotation to said gear in the opposite direction in a similar manner.

7. In a reversible ratchet drive mechanism, a mounting block, a rectangular slot cut into the upper surface of said mounting block, a bearing member with rectangular cross section fitted into said slot in said mounting block, an armature formed of a strip of magnetic material having a slot cut transversely across its bottom surface, said armature mounted with said slot fitting over said bearing member, two straps mounted one on each of opposite sides of said mounting block, said sides being perpendicular to said slot in said mounting block, slots cut into each of said straps parallel to the normal position of said armature and at a level above said armature, a spring formed of a strip of resilient material, two L-shaped ratchets mounted one on each end of said armature, a mounting plate having projecting ends fitting into said slots in said straps, a top plate, said spring mounted between said mounting plate and said top plate, whereby the center of said spring is anchored with respect to the normal position of said armature, said spring having its ends pressing downwardly one leg of each of said L-shaped ratchets against the upper surface of said armature, a screw passing through aligned holes in said top plate, armature, and mounting plate, whereby the adjustment of said screw regulates the pressure exerted by said armature upon said bearing member.

8. In a ratchet drive mechanism, a normally horizontal armature pivoted about its mid-point, two L-shaped ratchets pivotally mounted one on each end of said armature, a spring formed of a strip of resilient metal, and means for anchoring the center of said spring with respect to the normal position of said armature, said spring having its ends pressing downwardly one leg of each of said L-shaped ratchets against the upper surface of said armature, whereby the spring exerts forces tending to prevent said L-shaped ratchets from pivoting outwardly and at the same time tends to restore said armature to a horizontal position when it has been pivoted from said horizontal position.

9. In a circuit controlling device, a rotating member, electro-mechanical means including two thyratrons and a reversible rotary driving mechanism for revolving said rotating member in accordance with changes in altitude, an altimeter dial conveying information as to actual altitude, means including a cyclometer gear for controlling an external circuit in accordance with the number and direction of revolutions made by said rotating member, a train of gears actuated by said cyclometer gear, a counter operated by said train of gears for providing a number indication as to the number and direction of rotations of said rotating member, said counter appearing adjacent to said altimeter dial, whereby the condition of said controlled circuit may be readily ascertained and compared with said altimeter dial.

10. In a lamp mounting assembly, a lamp socket, an incandescent lamp mounted in said lamp socket, a top focusing plate, means for fastening said lamp socket onto said top focusing plate, a bottom focusing plate, an elongated slot and circular pivot hole cut into both top and bottom focusing plates, said elongated slot being cut along a circular arc having the center line of said hole as its center, an additional threaded hole in said bottom focusing plate, a screw passing through said pivot hole of said top focusing plate and into said threaded hole in said bottom focusing plate, a base member, an adjusting screw passing through said elongated slot in said top focusing plate and through said pivot hole in said bottom focusing plate and into said base member, an adjusting screw passing through said elongated slot in said bottom focusing plate and into said base member, whereby said focusing plates may be independently pivoted about their pivot holes thereby permitting adjustment of said lamp to any desired position over a limited area, and whereby said lamp may be held in position merely by fastening said adjusting screws.

11. In a device for controlling a circuit, two phototubes mounted adjacent each other, a strip of reflecting material mounted between said two phototubes and so shaped as to form three plane surfaces, the planes forming the edges of said strip having a light reflecting surface, the center plane of said strip having a non-reflecting surface, said strip so mounted and so formed with respect to the angles between said three plane surfaces that a light beam impinging upon one of said reflecting surfaces will be reflected onto the light sensitive element of one of said phototubes and so that a light beam impinging upon the other of said reflecting surfaces is reflected onto the light sensitive element of the other of said phototubes, whereas a light beam impinging upon the center non-reflecting portion of said strip of metal is not reflected onto either phototube.

12. In a circuit controlling device, a rotatable shaft, a rotatable member axially aligned with said rotatable shaft, a lamp socket, an incandescent lamp mounted in said lamp socket, means for mounting said lamp socket on said rotatable member so that the filament of said lamp has its axis aligned with the axis of said rotatable shaft and including adjusting means for permitting said lamp socket to be moved within a limited area with respect to said rotatable member, whereby said lamp may be so positioned as to have the axis of its filament aligned with the axis of said rotatable shaft regardless of whether or not the filament is on the axis of said lamp, a mirror on said rotatable shaft for reflecting a beam of light from said lamp, and means including photo-electric circuit elements responsive to said reflected light beam for governing the operation of said rotatable member, whereby the rotation of said shaft causes a corresponding rotation of said rotatable member.

13. In a circuit controlling mechanism operated in accordance with changes in altitude, an altimeter having a mirror positioned in accordance with the then existing altitude, a movable member having mounted thereon two light sensitive elements, a light source directing a beam of light onto said mirror which in turn causes a reflected light beam to fall between said two light sensitive elements onto a non-reflecting surface when said mirror and said movable member are in corresponding positions but causing such light beam to fall on one or the other of said light sensitive elements when the mirror is advanced in one direction or the other toward a new position, a reversible drive mechanism of the step-by-step type for operating said movable member in either selected direction, two thyratrons respectively associated with said two light sensitive elements, two control relays respectively associated with said thyratrons, one control relay being effective when energized for causing said drive mechanism to operate in one direction and the other control relay being effective when energized to cause said drive mechanism to operate in the opposite direction, circuit means causing that particular thyratron to be rendered active to energize its associated control relay when said reflected light beam impinges upon its corresponding light sensitive element, and circuit means including manually operable contacts capable of energizing either selected control relay independently of control by said light sensitive elements.

14. In a circuit controlling device operated in accordance with changes in altitude of an airplane, an altimeter mechanism enclosed in an air-tight case having an opening connected through a tube to the air outside the airplane, said case having a transparent portion, and said mechanism having a movable element adjacent said transparent portion which element is operated to different positions for changes in altitude of the airplane, a mirror mounted on said movable element, a movable chassis adjacent said transparent portion of said mechanism, means on said chassis including a source of light and means for focusing a beam of light onto said mirror as it moves so that a reflected beam of light describes a path on said chassis corresponding to the path of possible movement of said chassis, two spaced light sensitive elements mounted on said chassis within the path of said reflected beam of light, an electro-mechanical means controlled by said light sensitive elements in response to said reflected light beam for causing movement of said chassis corresponding to the movement of said movable element of said altimeter mechanism, a movable contact element mounted on said chassis and operated thereby, a fixed contact element cooperating with said movable contact element, whereby said contact elements are operatively governed by said altimeter without having said altimeter mechanism affected by ambient air pressures and without the application of any mechanical load to such altimeter mechanism.

15. In a contact making altimeter, an altimeter mechanism having a movable element operated to different positions for changes in altitude, a multiple position contacting device having a movable element operable to different positions, a step-by-step mechanism operatively connected to said movable contact element and having two windings one of which acts when intermittently energized to operate said movable contact element step-by-step in one direction and the other of which when intermittently energized acts to operate said movable contact element step-by-step in the opposite direction, two light sensitive devices associated with said movable contact element, a source of light, a mirror mounted on said movable element of said altimeter acting to reflect light from said source toward said light sensitive devices, a source of pulsing energy, and circuit means including said light sensitive devices for supplying pulsing energy from said pulsing source to one or the other of said windings of said step-by-step mechanism depending upon the incidence of said reflected light on one or the other of said light sensitive elements respectively.

16. In a contact making altimeter organization for airplanes comprising, an altimeter mechanism having a movable shaft operated to different positions in accordance with changes in altitude in the airplane, said shaft making more than one revolution for the range of altitudes through which the airplane may travel, a multiple position rotary circuit controller having a movable member and a stationary member, a step-by-step electromagnetic operating means for said movable contact member for operating it in either direction, two light responsive means mounted on said movable member, a mirror mounted on said rotary shaft and operated by said altimeter mechanism to direct a beam of light to one or the other of said light responsive means in accordance with its direction of movement for altitude changes, two relays each respectively connected to one of said light responsive means through suitable amplifying means, circuit means governed by said relays for operating said electromagnetic step-by-step means in one direction or the other depending upon which relay is then operated, said circuit means preventing operation of said means when said relays are both energized or both deenergized, and manually operable means associated with each relay for individually energizing that relay without interrupting the control of the other relay by its respective light sensitive means, whereby the initiation of said movable contact element in one direction by said manually operable means results in the continued operation of such element only until it arrives in a position corresponding to the position of said rotary shaft of said altimeter mechanism where it is stopped by the energization of the other relay in response to its light sensitive means.

RALPH W. HEWES.

REFERENCES CITED

The following references are of record in the file of this patent:

UNITED STATES PATENTS

| Number | Name | Date |
|---|---|---|
| 2,046,005 | Sprecker | June 30, 1936 |
| 2,391,123 | Carliss et al. | Dec. 18, 1945 |